United States Patent [19]

Krause

[11] 4,343,359
[45] Aug. 10, 1982

[54] PERFORATED PIPE

[76] Inventor: Horst J. Krause, 5305 Oleander Ave., Ft. Pierce, Fla. 33450

[21] Appl. No.: 188,327

[22] Filed: Sep. 18, 1980

[51] Int. Cl.³ .............................................. E21B 43/08
[52] U.S. Cl. .................................. 166/233; 166/227; 29/163.5 CW; 210/499
[58] Field of Search .............. 166/227, 233, 236, 242; 29/163.5 CW; 210/498, 499

[56]  References Cited

U.S. PATENT DOCUMENTS

| 514,313 | 2/1894 | Eckstein | 210/499 X |
|---|---|---|---|
| 1,027,917 | 5/1912 | Smith | 166/227 X |
| 1,028,066 | 5/1912 | Smith | 166/227 UX |
| 1,367,609 | 2/1921 | Layne | 29/163.5 CW |
| 1,507,580 | 9/1924 | Cater | 166/227 |
| 1,620,412 | 3/1927 | Tweeddale | 210/498 X |
| 1,839,284 | 1/1932 | White | 166/227 |
| 1,994,344 | 3/1935 | Harrington | 166/227 |
| 2,217,327 | 10/1940 | Zeidler, Jr. | 166/227 X |
| 2,634,613 | 4/1953 | Napier | 166/227 X |
| 2,933,137 | 4/1960 | D'Auoiffret et al. | 166/227 X |
| 3,087,560 | 4/1963 | Dodson | 166/236 X |
| 3,431,975 | 3/1969 | Blake | 166/227 |
| 3,844,347 | 10/1974 | Stotzel et al. | 166/227 |

FOREIGN PATENT DOCUMENTS 813677  5/1969  Canada ................ 166/227

Primary Examiner—James A. Leppink
Assistant Examiner—George A. Suchfield
Attorney, Agent, or Firm—Beaman & Beaman

[57] ABSTRACT

A perforated pipe and method of making the same for use in wells, screen and the like, the perforations being in the form of sets of oppositely disposed slits in a tubular member defined along a helical path; the preparation being characterized as self-cleaning and resulting from a balanced forming operation to substantially reduce warpage.

3 Claims, 9 Drawing Figures

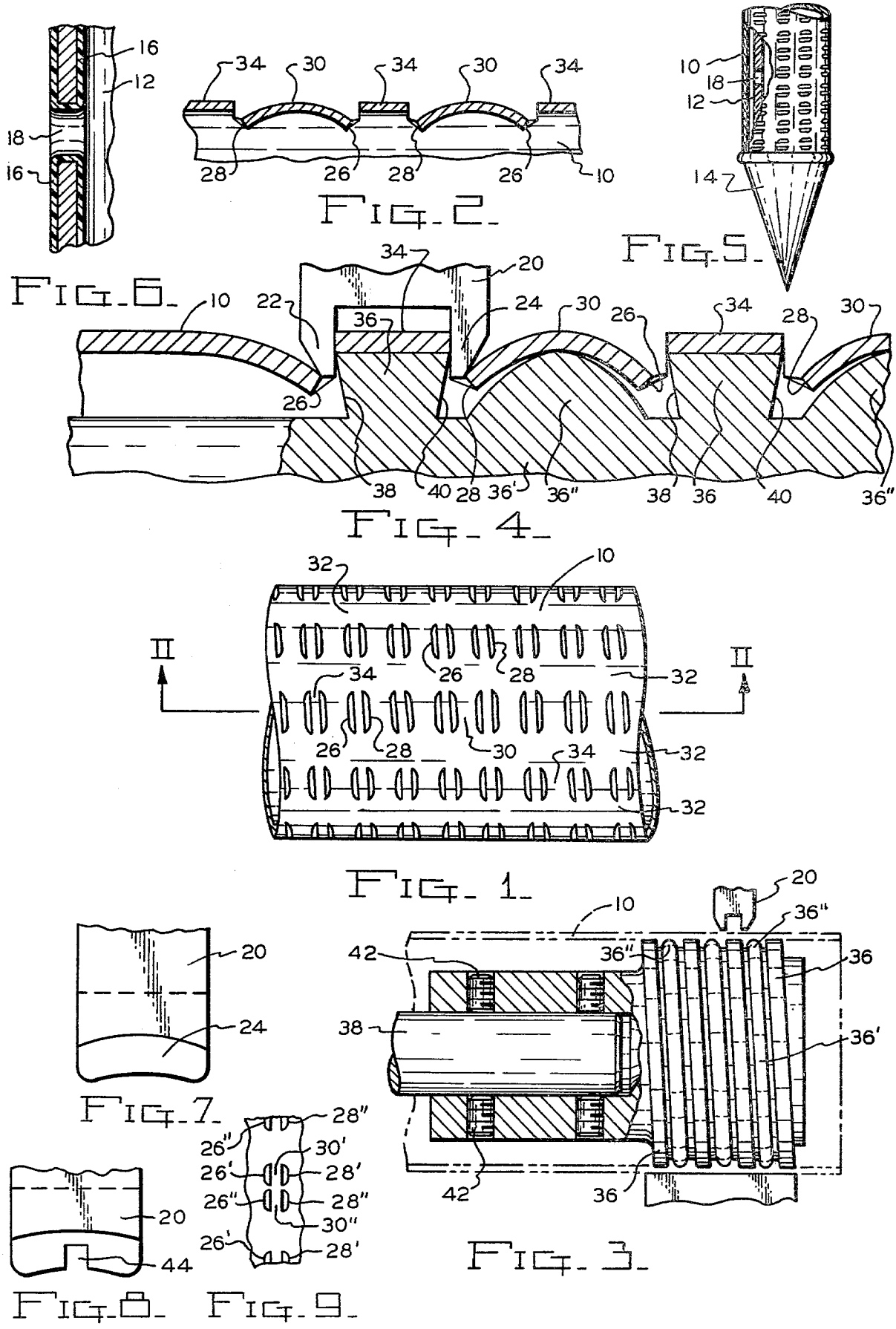

4,343,359

PERFORATED PIPE

BACKGROUND OF THE INVENTION

The invention relates to screens and particularly to well screens, being an improvement over the structure and method disclosed in the Zeidler U.S. Pat. No. 2,217,327 issued Oct. 8, 1940, now expired.

It has been found that when the structure and method of the aforesaid patent is followed, excessive tool wear is experienced and the perforated tube tends to be warped following the forming of slits therein, particularly with stainless steel tubes.

SUMMARY OF THE INVENTION

According to the invention, the rate of performation has been materially increased and warpage of the tube has been substantially eliminated. At the same tool wear has been greatly improved with changes in working clearance with slight rotation of the die repeatedly presenting a sharp surface to the slitting punch.

These improvements have resulted from the use of a die mandrel having a helical rib with complementary sides slightly converging toward the longitudinal axis of the mandrel to provide radial clearance on opposite side of that portion of the rib engaging the inner surface of the tube. The punch, which straddles the helical rib, exerts a balanced slitting action on opposite sides of the rib to provide sets of similar but oppositely disposed slits which tend to cause self-cleaning flow turbulence in the locality of each pair of complementary slits. At the same time, by balancing the slitting forces of the punch, warpage of the tube during slitting has been substantially reduced over prior practice.

Another advantage flowing from the slitting operation described in the last paragraph results from the arched form of the tube structure between adjacent sets of complementary slits when the sets are arranged along rows parallel to the longitudinall axis of the tube, the rows being spaced by unslitted longitudinal portions of the tube. Such arched form tend to provide greater resistance to deformation of the slits during the driving of the well points then found in the prior art.

BRIEF DESCRIPTION OF THE DRAWING

FIG. 1 is a fragmentary plan view of a tubular well screen,

FIG. 2 is a cross sectional view of two sets of slits taken on a portion of line II—II of FIG. 1, FIG. 3 is a side elevational view of the die mandrel, FIG. 4 is a fragmentary side elevational view of the slitting operation, FIG. 5 is a fragmentary side elevational view of a point having a coated inner reinforcing tube, FIG. 6 is an enlarged vertical cross section of a portion of the coated inner tube, FIG. 7 is a side elevational view of the punch shown in FIG. 4, FIG. 8 is a view similar to FIG. 7 of a modified punch, and FIG. 9 is a fragmentary view similar to FIG. 1 of the slit form of the punch of FIG. 8.

DESCRIPTION OF THE PREFERRED EMBODIMENT

The present invention involves the use of the method broadly disclosed in the aforesaid Zeidler patent with respect to the forming of a well screen on a die mandrel inserted into a tube, the tube being circumferential indexed and axially advanced during the slitting operation along a helical path. As disclosed in the Zeidler patent the die mandrel has a helical rib about which the tube is formed and slitted and which acts in the manner of a lead screw for advancing the tube along the die mandrel and relative to the slitting punch, upon step by step rotation of the tube.

The tubular screen shown in FIG. 1 may be used, for example, on a drive well point of the kind shown in U.S. Pat. No. 3,087,560. A tube 10, preferably of stainless steel may be used with or without an inner perforated reinforcing tube depending upon soil or other condition. In most localities, the improved strength of the tube following slitting is such that only the tube 10 is required between the point and the drive coupling thus avoiding the corrosion problem experienced with concentric tubes of different materials.

When an inner tube is required such as the tube 12 of FIGS. 5 and 6, it is attached to the point 14 and extends to the drive coupling upper end of the drive point structure such as disclosed in U.S. Pat. No. 3,087,560. However, according to the present invention, the inner tube 12 is spaced, in the order of ⅛", from the tube 10 and the tube 12 is coated as to all its exposed surfaces with a corrosion resistant material such as polyvinyl chloride. In FIG. 6 the coating 16 is shown applied to the inner and outer walls of the tube 12 as well as to the wall defining the performation 18.

As will be hereinafter described in detail, the slitting of the screen tube 10 avoid warpage with the result that the tubes 10 and 12 are substantially retained in spaced concentric relation and no abrasion takes place between the inwardly formed surfaces of the outer tube 10 and the coated outer surface of the inner tube 12 during driving of the well point.

While the present invention uses the same basic method of slitting the screen as disclosed in the Zeidler U.S. Pat. No. 2,217,327, several improvements have been made thereover. In lieu of a single slit being formed by the punch, the punch 20 has two spaced slitting portions 22 and 24 to provide the complementary oppositely disposed slits 26 and 28 separated by an arched portion 30 which is connected to the longitudinal unslitted portions 32 of the tube 10.

Each set of slits 26 and 28 is spaced by a relatively unformed portion 34 of the tube 10. Thus the portions 32 and 34 retain the form of the tube 10 prior to slitting with the major part of the arched portion 30 being slightly disposed inwardly of the remaining outer surface of the tube 10.

In practice the portions 22 and 24 of the punch 20 are arcuate in the planes of the slits 26 and 28 as shown in FIG. 7, the arc corresponding substantially to the inside radius of the tube 10 whereby the slits 26 and 28 are arcuate and of substantial uniform opening throughout their length.

It has been found that if the helical rib 36 of the die mandrel 36' is formed with radially inwardly slightly converging sides 38 and 40 in the order of one degree to a plane normal to the longitudinal axis of the tube 10 that the tool life of the punch 20 and die mandrel 36' is greatly extended. By having the die mandrel 36' angularly and axially adjustable on the shank 38 through set screws 42, as that portion of the rib 36 coacting with the punch 20 become dull or damages the die mandrel 36' may be slightly rotated and an unused portion axial aligned with the punch 20. It will be noted that the die mandrel 36' has a helical back up rib 36" over which the portions 30 are formed.

To give a commercial example of the invention as applied to the making of drive well points, the opening of the slits 26 and 28 may be conveniently formed within a range in the order of 0.008"–0.060". The diameter of the tube 10 forming the screen may be in the order of 1¼"–4". Preferably the tube is of 0.049–0.082 wall thickness of stainless steel. Good results have been obtained by using a 304 stainless steel alloy.

In the modification of FIG. 8 the punch 20' has a cross slot 44 which results in forming four slits rather than two each slitting of the punch 20'. Thus as shown in FIG. 9, the slit 28 of FIG. 1 become two similar slits 28' and 28". Likewise the slit 26 of FIG. 1 now takes the form of slits 26' and 26". It will be understood that the arched portion 30 of FIG. 1 now takes the form of arched portions 30' and 30".

I claim:

1. A screen of the type described comprising sets of slits disposed along a helical path defined on an elongated tube, the slits of each set being parallel to each other and opening in opposite direction into the interior of the tube, said sets being so spaced along said path as to dispose the sets located 360° from each other along said path in alignment longitudinal of said tube and so spaced from the directly adjacent sets along said path as to provide circumferentially spaced longitudinal extending unslitted tube area.

2. A screen as defined in claim 1 wherein the sets of slits disposed in alignment longitudinally of the tube are spaced by arcuate portions of the tube, the concave sides of the arcuate portions facing the longitudinal axis of the tube and the innermost sides of said arcuate portions defining the inner most part of each slit, and portions of said tube defining the circumference thereof defining the outermost part of each slit of each set and disposed in said path.

3. A screen as defined in claim 1 wherein there is a coated reinforcing tube concentric with and located with said first tube in spaced relation.

* * * * *